United States Patent Office 3,268,332
Patented August 23, 1966

3,268,332
ELECTROPHOTOGRAPHIC ELEMENT
Paul J. Caruso, West Newton, Richard P. Flynn, Somerville, Gerald L. McLeod, Lexington, David S. Most, Peabody, and Herbert N. Schlein, Framingham, Mass., assignors to Itek Corporation, Lexington, Mass., a corporation of Delaware
No Drawing. Filed May 25, 1962, Ser. No. 197,596
2 Claims. (Cl. 96—1)

This invention relates to cohesive media, and relates in particular to cohesive binder matrices for solid particles, and to articles incorporating such binder matrices.

The present invention concerns new cohesive and adhesive binder matrix materials for finely divided solid particles. Although the materials of the invention are useful as matrix materials in a wide variety of useful applications, and for the embodiment of numerous different kinds of particulate solids, they are of special utility as binders for coating image forming media, particularly those used in electrostatic or persistent internal polarization reproducing processes.

Image reproduction techniques involving electrostatic processes, such as those discussed in the "RCA Review" (1959), pages 753–769, or persistent internal polarization phenomena, such as those discussed in "Physical Review," volume 97, No. 6 (1955), pages 1596–1610, are conveniently practiced with image forming media comprising a substrate coated with finely divided particles of a photoconductor or phosphors applied to the substrate in a binder matrix. The substrate, which preferably is flexible, may be porous or non-porous, such as of paper, wood, cloth, glass or metal. The binder is an insulating material in which the semiconductor or phosphor particles are embedded, and which adheres the particles to the substrate.

The present invention relates to new binder compositions superior to those known in the art for preparing image forming media in being highly flexible, having an unusually high capacity for solids, being strongly adhesive to substrate materials coated therewith, having good rheological properties permitting easy handling during mixing and coating, and giving humidity impervious coatings with excellent insulating properties which impart to the finished media a slow dark decay and a capacity for accepting a large electrostatic charge (in electrostatic processes, for example). The last mentioned properties are of particular utility for giving images of high contrast and low background. In addition, the new binder systems are compatible with certain particularly convenient nonflammable volatile liquid developers. Liquid developers, which comprise finely divided particles dispersed in a liquid, are commonly used to develop latent electrostatic and polarization images.

The new binder matrices of the invention comprise three resinous components. The first component is a high resistivity styrene-containing material. Although polystyrene has a desirable high resistivity, it is a relatively inflexible material, and copolymers of styrene containing at least about 10–15% of a rubbery diolefinic comonomer such as butadiene, isoprene or chloroprene are preferred for use in the invention. Additionally, ternary copolymers of styrene, a rubbery component and acrylonitrile have excellent abrasion resistance and improved dielectric constant, as compared with the binary copolymers just mentioned. In such ternary materials, the acrylonitrile may be present in amounts up to about 25% by weight of the polymer.

The second resinous component of the new binders is a flexible, adhesive polyvinylidene chloride polymer or copolymer having a high solids capacity. Particularly suitable materials are various grades of "Saran," i.e. polyvinylidene chloride homopolymers or copolymers containing up to 10–15% acrylonitrile. These resins are excellent mechanical binders for solids and impart capacity for holding solids, without loss of adhesive properties, to the compositions of the invention.

The third resinous component in the binders is a high resistivity material contributing flexibilty and plasticity to the binder, and acting principally to reduce foam in the solvent-binder-solid systems employed in coating substrate materials. The foam-reducing components are alkyd resins, suitably soya-based alkyd resins such as those produced by reacting phthalic acid with soya bean alcohols.

In the binders of the invention, the three resinous components are preferably present such that a major portion of the binder by weight comprises the styrene-containing copolymer, at least a major portion of the balance is a polyvinylidene chloride polymer or copolymer, and the balance is the alkyd defoaming resin. In general, the binder should contain at least 50% of the styrene-containing component, at least 25% of the polyvinylidene chloride component, and at least ½% of the alkyd defoaming resin. Particularly preferred binders are obtained when these three components are in a preferred weight ratio of 4:2:1.

For admixture with finely divided solids and application to a suitable substrate, the resins of the invention are combined in a mutual solvent. Although other solvents dissolving all three of the resins can be employed, ketone materials have proved especially desirable as solvents, and the binders are conveniently obtained by dispersing the resinous components in an aliphatic ketone such as acetone, methyl ethyl ketone, dibutyl ketone, or cyclic aliphatic ketones such as cyclohexanone.

The resin solutions are then combined with the solid materials to be dispersed in a binder. Although the solids can be dispersed in the solution in amounts such that on drying the resulting coatings will contain only about 10 percent by weight of binder, particularly good results are obtained when the solids to binder ratio by weight does not exceed about 7:1 (about 14 percent of binder). Of course, lower ratios of solids to binder can be employed, but it is generally desirable to have as high a solids to binder ratio as is compatible with good results.

The resulting dispersions of solids in dissolved resin binders are conventionally applied with a doctor blade, roll coaters, spot coaters, curtain coaters, or the like, in an amount of about 8–25 pounds/3000 ft.$^2$ on a dry solids basis (binder plus pigment). Particularly good image reproducing media are obtained with a coating of about 15–25 pounds of dry solids per 3000 ft.$^2$ of backing. After application, the coatings are dried, either by simple air drying or by forced drying using heat.

A better understanding of the invention and of its many advantages will be had by referring to the following example, given by way of illustration.

*Example 1*

122.5 parts by weight of finely divided zinc oxide, 10 parts by weight (based on dry solids content) of a high-impact styrene-butadiene copolymer, 5 parts by weight of polyvinylidene chloride polymer, and 2.5 parts by weight of soya-based alkyd resin were dispersed in sufficient methyl ethyl ketone (about 200 parts by weight) in agitated mixing means for about one minute to form a slurry.

The slurry was then conventionally applied as a coating to a conductive paper backing in a thickness of about 15–25 pounds per 3000 ft.$^2$. The coating was then baked for 3 minutes at 90° C.

The resulting paper is useful for electrostatic reproducing processes wherein, for example, the surface of the coated paper is uniformly electrostatically charged by a corona discharge device. The charged surface is then selectively discharged by exposure to a light image. Where light strikes the charged paper, rendering the zinc oxide particles photoconducting, the charge is dissipated. The latent electrostatic image remaining on the paper can be developed by sprinkling the paper with finely divided opaque particles, such as of carbon black, having a charge opposite to that of the image.

As known in the art, the photosensitivity of semiconductor materials such as zinc oxide can be increased in the visible region by sensitizing the particles with suitable dyes. Thus, a particularly desirable paper for electrostatic printing purposes is prepared when the zinc oxide of the sample comprises three equal portions of zinc oxide, each respectively sensitized with Auramine, Alpha Azurine, and Rose Bengal. Other suitable photoconductive semiconducting materials are oxides such as titanium dioxide and the like.

Paper suitable for use in persistent internal polarization reproduction processes can be prepared in a similar fashion by substituting photoconductive insulating materials exhibiting persistent internal polarization for the zinc oxide materials of the example. Suitable materials are phosphors such as numerous doped zinc sulfides, cadmium sulfide, and mixed (Zn:Cd) S phosphors.

Development of the media prepared with the binders of the present invention is preferably performed using a liquid developer comprising nonflammable volatile liquids which are poor solvents for the binder substance, i.e. liquids which swell and tackify but do not dissolve the binder. Finely divided opaque particles, such as of carbon black, are suitable suspended in these fluids with the use of a substance imparting an electric charge, usually a positive charge to the suspended particles.

For use with the binders of the present invention, developers containing a chlorinated or chlorofluorinated aliphatic hydrocarbon having two to four carbon atoms and a boiling point above about 40° C. as the suspending liquid have proved particularly advantageous. These materials include certain relatively involatile liquids known under the trade names "Freon," "Ucon," and "Genetron." If desired, these liquids may be combined with chlorinated solvents such as methylene chloride, carbon tetrachloride, chloroform, perchloroethylene, and the like, to decrease the solvent action of the fluorine-containing materials on the binders.

As opaque particles for suspension in these fluids, carbon black has proved particularly advantageous. As a charge imparting substance, mixed hydrocarbon substances commercially available as lubricants under the trade name of "Coblax" are particularly suitable, as disclosed in copending U.S. patent application Serial No. 123,038.

A liquid developer particularly suitable for use with the resin binders disclosed herein comprises "Freon T" ($CClF_2CFCl_2$), having a boiling point of about 50° C., in optional admixture with up to 5-20% by volume of carbon tetrachloride and containing about 4-8 grams per liter of a mixture containing one part by weight of carbon black and from 3-6 parts by weight of a charge-imparting substance such as the commercial material "Coblax," which is a mixture of asphaltic polycyclic hydrocarbons, largely aromatic, but having long straight chain aliphatic residues attached thereto, and having a molecular weight of about 1500.

Although specific embodiments have been shown and described herein, it will be understood that they are but illustrative.

What is claimed is:
1. In a radiation responsive image forming medium comprising a substrate having thereon a photoconductive insulating coating comprising photoconductive particles in an electrically insulating binder matrix therefor, the improvement in which said binder comprises, in combination, (A) at least about 50 percent by weight of a member of the group consisting of a homopolymer of styrene, a binary copolymer of styrene and a diolefinic comonomer, and a ternary copolymer of styrene, a diolefinic comonomer, and acrylonitrile, (B) at least about 25 percent of a member of the group consisting of a homopolymer of vinylidene chloride and a copolymer of vinylidene chloride with acrylonitrile, and (C) at least ½ percent of an alkyd resin.

2. A radiation responsive image forming medium as in claim 1 wherein component (A) is a ternary copolymer of styrene containing at least about 10-15 percent of said diolefinic comonomer and up to about 25 percent by weight of acrylonitrile, and component (B) is a copolymer of vinylidene chloride and up to 10-15 percent of acrylonitrile.

References Cited by the Examiner
UNITED STATES PATENTS

| | | | |
|---|---|---|---|
| 2,786,785 | 3/1957 | Wise | 260—45.4 |
| 2,877,203 | 3/1959 | Forsythe et al. | 260—45.4 |
| 2,919,206 | 12/1959 | Malmquist | 260—45.4 |
| 2,986,521 | 5/1961 | Wielicki | 252—62.1 |
| 3,011,999 | 12/1961 | Parker et al. | 260—45.4 |
| 3,051,569 | 8/1962 | Sugarman et al. | 96—1 |
| 3,066,023 | 11/1962 | Schlesinger | 96—1 |
| 3,079,342 | 2/1963 | Insalaco | 252—62.1 |
| 3,088,927 | 5/1963 | Dissen | 260—45.4 |
| 3,121,006 | 2/1964 | Middleton et al. | 96—1 |
| 3,121,008 | 2/1964 | Jones et al. | 96—1 |
| 3,128,179 | 4/1964 | Kendall et al. | 96—1 |

NORMAN G. TORCHIN, *Primary Examiner.*

T. J. HOFFMAN, *Assistant Examiner.*